US008358768B2

(12) United States Patent
Heinze et al.

(10) Patent No.: US 8,358,768 B2
(45) Date of Patent: Jan. 22, 2013

(54) METHODS, SYSTEMS, AND COMPUTER PROGRAM PRODUCTS FOR PROVIDING A COUNTRY CODE IDENTIFIER IN AN INTERNATIONAL ENUM SYSTEM

(75) Inventors: Christopher R. Heinze, Raleigh, NC (US); Peter J. Marsico, Chapel Hill, NC (US); Maria A. Wiatrowski, Raleigh, NC (US)

(73) Assignee: Tekelec, Inc., Morrisville, NC (US)

( * ) Notice: Subject to any disclaimer, the term of this patent is extended or adjusted under 35 U.S.C. 154(b) by 1145 days.

(21) Appl. No.: 11/786,051

(22) Filed: Apr. 10, 2007

(65) Prior Publication Data

US 2008/0049918 A1  Feb. 28, 2008

Related U.S. Application Data

(60) Provisional application No. 60/840,230, filed on Aug. 25, 2006.

(51) Int. Cl.
*H04M 7/00* (2006.01)

(52) U.S. Cl. .............. 379/220.01; 379/221.14; 379/196; 379/207.02; 370/352; 370/356; 370/389; 370/395.2

(58) Field of Classification Search .............. 379/220.01, 379/221.14, 196; 370/352, 389
See application file for complete search history.

(56) References Cited

U.S. PATENT DOCUMENTS

| 6,295,458 | B1 * | 9/2001 | Takahashi | 455/466 |
|---|---|---|---|---|
| 6,347,085 | B2 * | 2/2002 | Kelly | 370/352 |
| 6,968,050 | B1 * | 11/2005 | Pershan et al. | 379/196 |
| 2002/0027915 | A1 * | 3/2002 | Foti et al. | 370/392 |
| 2002/0167943 | A1 | 11/2002 | Hakim et al. | |
| 2003/0105864 | A1 * | 6/2003 | Mulligan et al. | 709/225 |
| 2003/0128693 | A1 | 7/2003 | Segal | |
| 2004/0258063 | A1 * | 12/2004 | Raith et al. | 370/389 |
| 2005/0125723 | A1 | 6/2005 | Griswold et al. | |
| 2005/0243805 | A1 * | 11/2005 | Kaizawa et al. | 370/352 |
| 2005/0286499 | A1 * | 12/2005 | Kobayashi et al. | 370/352 |
| 2006/0029045 | A1 * | 2/2006 | Kobayashi et al. | 370/352 |
| 2006/0072553 | A1 * | 4/2006 | Miyajima et al. | 370/352 |

FOREIGN PATENT DOCUMENTS

| WO | WO 2004/088951 A2 | 10/2004 |
|---|---|---|
| WO | WO 2006/048709 A2 | 5/2006 |
| WO | WO 2008/027243 A2 | 3/2008 |

OTHER PUBLICATIONS

Faltstrom, RFC 3761—ENUM to URI, Apr. 2004, 16 pages.*
Notification of Transmittal of the International Search Report and the Written Opinion of the International Searching Authority, or the Declaration for International Application No. PCT/US07/18414 (Feb. 29, 2008).
Communication of European publication number and information on the application of Article 67(3) EPC for European Patent No. 2062424 (Apr. 29, 2009).

(Continued)

*Primary Examiner* — Joseph J Nguyen
(74) *Attorney, Agent, or Firm* — Jenkins, Wilson, Taylor & Hunt, P.A.

(57) ABSTRACT

Methods, systems, and computer program products for providing a country code identifier in an international ENUM system are disclosed. According to one method, a message is received that includes a telephone number and information associated with a country of origin of the telephone number. A country code identifier may be determined for the telephone number based on the information associated with the country of origin of the telephone number. Further, the country code identifier may be appended to the telephone number of the received message.

25 Claims, 9 Drawing Sheets

OTHER PUBLICATIONS

Mealling, "Dynamic Delegation Discovery System (DDDS) Part One: The Comprehensive DDDS," RFC 3401, pp. 1-6 (Oct. 2002).

Faltstrom, "E.164 number and DNS," RFC 2916, pp. 1-10 (Sep. 2000).

"ENUM: Driving convergence in the Internet Age," Neustar, pp. 1-5 (Publication Date Unknown).

International Telecommunication Union "Series E: Overall Network Operation, Telephone Service, Service Operation and Human Factors," E.164, Supplement 4 (May 2003).

Mealling, "Dynamic Delegation Discovery System (DDDS) Part Four: The Uniform Resource Identifiers (URI) Resolution Application," Network Working Group, RFC 3404 (Oct. 2002).

Mealling, "Dynamic Delegation Discovery System (DDDS) Part Two: The Algorithm," Network Working Group, RFC 3402 (Oct. 2002).

Levin, "ENUM Service Registration for H.323 URL," ENUM, Internet Draft (Jun. 2003).

Chinese Official Action for Chinese Patent Application No. 200780038743.6 (Aug. 25, 2011).

Second Official Action for Chinese Patent Application No. 200780038743.6 (May 22, 2012).

* cited by examiner

130

APPLICATION
PRESENTATION
SESSION

```
;; HEADER SECTION
;; id = 41555
;; qr = 1   opcode = QUERY   aa = 1   tc = 0   rd = 1
;; ra = 1   ad = 0   cd = 0   rcode = NOERROR
;; qdcount = 1   ancount = 3   nscount = 1   arcount = 0

;; QUESTION SECTION (1 record)
;; 0.3.5.7.9.4.7.3.4.3.3.e164.arpa   IN   NAPTR

;; ANSWER SECTION (3 records)
0.3.5.7.9.4.7.3.4.3.3.e164.arpa   0   IN   NAPTR   5688 39270 "U" "mms+E2U"
"!^.*$!mailto:+12342342341/PPMN@mmsc.mycarrier.com!".
0.3.5.7.9.4.7.3.4.3.3.e164.arpa   0   IN   NAPTR   5688 39994 "U" "mms+E2U"
"!^.*$!mailto:+12342342341/PPMN@mmsc2.mycarrier.com!".
0.3.5.7.9.4.7.3.4.3.3.e164.arpa   0   IN   NAPTR   5699 25 "U" "mms+E2U"
"!^.*$!mailto:+12342342341/PPMN@mmsc3.mycarrier.com!".

;; AUTHORITY SECTION (1 record)
1.e.164.arpa.   0   IN   NS   cary-c.

;; ADDITIONAL SECTION (0 records)
```

FIG. 4

```
;; HEADER SECTION
;; id = 41555
;; qr = 0   opcode = QUERY   aa = 0   tc = 0   rd = 0
;; ra = 0   ad = 0   cd = 0   rcode = NOERROR
;; qdcount = 1 ancount = 0 nscount = 0 arcount = 1

;; QUESTION SECTION (1 record)
;; 0.3.5.7.9.4.7.3.4.e164.arpa.    IN    NAPTR

;; ANSWER SECTION (0 records)

;; AUTHORITY SECTION (0 records)

;; ADDITIONAL SECTION (1 records)
Country of Origin = France
End of packet sent
```

APPLICATION
PRESENTATION
SESSION

FIG. 9

METHODS, SYSTEMS, AND COMPUTER PROGRAM PRODUCTS FOR PROVIDING A COUNTRY CODE IDENTIFIER IN AN INTERNATIONAL ENUM SYSTEM

RELATED APPLICATIONS

This application claims the benefit of U.S. Provisional Patent Application Ser. No. 60/840,230 filed Aug. 25, 2006, the disclosure of which is incorporated by reference herein.

TECHNICAL FIELD

The subject matter described herein relates to providing country code identifiers. More particularly, the subject matter described herein relates to methods, systems, and computer program products for providing country code identifiers in an international ENUM system.

BACKGROUND

The E.164 Number Mapping (ENUM) system has been developed by the Internet Engineering Task Force (IETF) for facilitating the interconnection of communications networks that rely on telephone numbers with the communications networks that utilize the Domain Name System (DNS). In particular, the ENUM system assists with the convergence of the Public Switched Telephone Network (PSTN) and Internet protocol (IP) networks. The ENUM system can map a particular number referred to as an E.164 number to one or more Uniform Resource Identifiers (URIs) in the DNS. URIs are strings of characters that identify resources such as documents, images, files, databases, e-mail addresses, websites or other resources or services in a common structured format. A URI can include a SIP URI, an instant messaging (IM) identifier, an e-mail address identifier, an Internet chat session identifier, and an IP address. The ENUM system provides a solution to the problem of finding services on the Internet using only a telephone number.

In one example, the use of the ENUM system may be initiated when a user of a conventional telephone dials a called party number (referred to herein as an E.164 telephone number) for reaching another telephone. An ISDN User Part (ISUP) Initial Address Message (IAM) containing the called party number is routed to the Public Switched Telephone Network (PSTN). The PSTN can then communicate an ISUP IAM message containing the E.164 telephone number to a gateway. The gateway can convert the E.164 telephone number into ENUM message format for transmission in an ENUM query. The E.164 telephone number is converted to ENUM message format by reversing the digit order of the dialed E.164 telephone number and appending the highest level domain e164.arpa to the end. For example, if the original E.164 number is 123-456-7890, the ENUM query is converted 0.9.8.7.6.5.4.3.2.1.e164.arpa (also referred to herein as an E.164 telephone number). Next, the ENUM query is communicated to an ENUM server. The ENUM server uses the ENUM query to retrieve one or more naming authority pointer (NAPTR) records associated with the E.164 number. Each of the NAPTR records may identify at least one URI corresponding to the user with the E.164 telephone number. The URI is then communicated to the gateway in an ENUM response for establishing communication between the telephones.

In an international ENUM networking environment, an ENUM server may receive ENUM queries from gateways associated with different country codes. For example, the ENUM server may receive ENUM queries from gateways national networks located in France and Italy. These different national networks have different country codes. This situation can be problematic for an ENUM server when an ENUM query is received that includes an E.164 telephone number without a country code prefix and the same E.164 telephone number is valid in multiple countries. In this case, the ENUM server would not be able to identify the gateway to which to respond with an ENUM response. Thus, it would be advantageous to be able to determine a country code prefix based on information in an ENUM query that includes an E.164 telephone number without a country code prefix.

Accordingly, based on the foregoing, there exists a need for methods, systems, and computer program products for determining a country code prefix based on information in an ENUM query that includes an E.164 telephone number without a country code prefix.

SUMMARY

The subject matter described herein includes methods, systems, and computer program products for providing a country code identifier in an international ENUM system. According to one aspect, a method according to the subject matter described herein includes receiving a message including a telephone number and information associated with a country of origin of the telephone number. A country code identifier may be determined for the telephone number based on the information associated with the country of origin of the telephone number. Further, the country code identifier may be appended to the telephone number of the received message.

According to one aspect, a method according to the subject matter described herein includes receiving a message including a telephone number and information associated with a country of origin of the telephone number. An ENUM processing action may be determined based on the information associated with the country of origin of the telephone number. Further, the ENUM processing action may be performed based on the information associated with a country of origin of the telephone number.

The subject matter described herein for providing a country code identifier in an international ENUM system and for ENUM processing in an international ENUM system may be implemented using a computer program product comprising computer executable instructions embodied in a computer readable medium. Exemplary computer readable media suitable for implementing the subject matter described herein include disk memory devices, programmable logic devices, application specific integrated circuits, and downloadable electrical signals. In addition, a computer readable medium that implements the subject matter described herein may be located on a single device or computing platform distributed across multiple physical devices and/or computing platforms.

BRIEF DESCRIPTION OF THE DRAWINGS

Exemplary embodiments of the subject matter will now be explained with reference to the accompanying drawings, of which:

FIG. 4 is a block diagram of a portion of an ENUM response message shown in FIG. 1;

FIG. 9 is a block diagram of a portion of an exemplary ENUM query including a country of origin parameter value according to an embodiment of the subject matter described herein.

DETAILED DESCRIPTION

Methods, systems, and computer program products for providing a country code identifier in an international ENUM system according to embodiments of the subject matter described herein may be implemented in any suitable network device or devices configured to receive a message including a telephone number, such as an E.164 telephone number. For example, the methods, systems, and computer program products may be implemented in a router, a switch, a gateway, an ENUM server, a presence server, or other suitable network device. In one exemplary implementation, the subject matter described herein may be implemented as a computer program product comprising computer-executable instructions embodied in a computer readable medium accessible by a network device. Exemplary computer-readable media suitable for implementing the subject matter described herein include chip memory devices, optical disks, magnetic disks, downloadable electrical signals, application-specific integrated circuits, programmable logic devices, or any other medium capable of storing computer-executable instructions.

The subject matter described herein can efficiently provide a country code identifier for a telephone number, such as an E.164 telephone number, in an international ENUM system. In one exemplary implementation, the provision of a country code identifier for an E.164 telephone number in an international ENUM system can be initiated when a user at an end device, such as a telephone, enters a called party telephone number, or an E.164 number, that lacks a country code prefix. The number can be entered for reaching another end device. The called party telephone number can be routed to and received by a gateway or other device suitable for transmitting an ENUM query message including the telephone number to an ENUM server. The ENUM query message may also include information associated with a country of origin of the telephone number. The ENUM server may use the information associated with the country of origin of the telephone number for determining a country code identifier for the telephone number. For example, the ENUM server may use the information associated with the country of origin of the telephone number for performing a lookup in a mapping table in an ENUM database for a country code identifier for the telephone number. Next, the ENUM server can append the country code identifier to the telephone number of the received ENUM query message. Further, the ENUM server can generate an ENUM response message including the telephone number with the appended country code identifier for communication to the originator of the ENUM query message.

Figure 1:
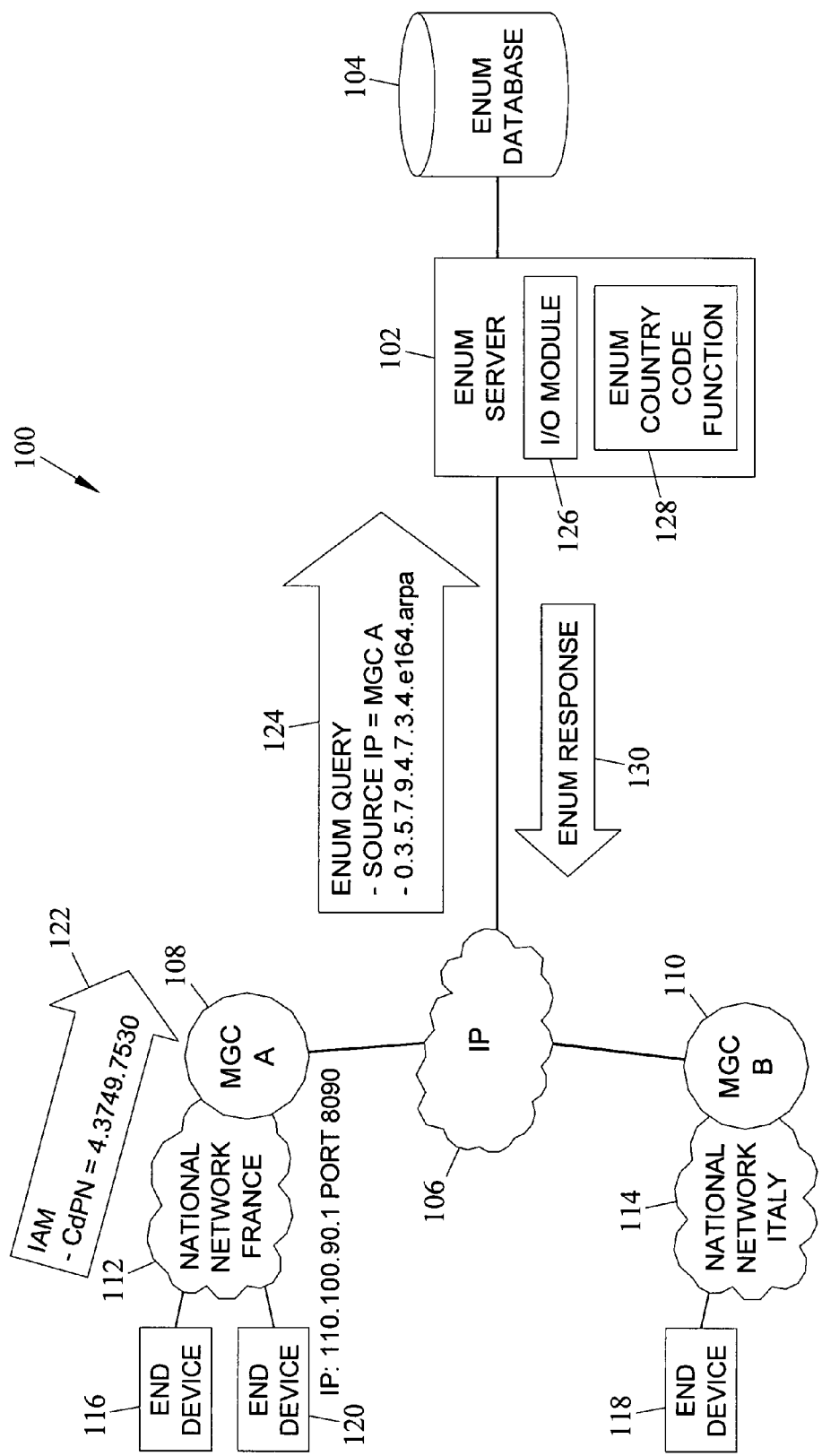
FIG. 1 is an exemplary system for providing a country code identifier in an international ENUM system according to an embodiment of the subject matter described herein.

FIG. 1 illustrates an exemplary system for providing a country code identifier in an international ENUM system, generally designated 100, according to an embodiment of the subject matter described herein. Referring to FIG. 1, system 100 can include an ENUM server 102 and an ENUM database 104 in operable communication with each other and with an IP network 106. IP network 106 can communicate ENUM messages between ENUM server 102 and media gateway controllers (MGCs) 108 and 110 associated with different national communications networks 112 and 114, respectively. Signaling messages can be communicated between MGCs 108 and 110 for setting up a communications link between end devices 116 and 118 associated with networks 112 and 114, respectively. Alternatively, one of MGCs 108 and 118 may set up a communications link between a respective end device and another suitable end device within one of respective networks 112 and 114. Exemplary end devices include a telephone, a mobile phone, and a computer.

Figure 2:
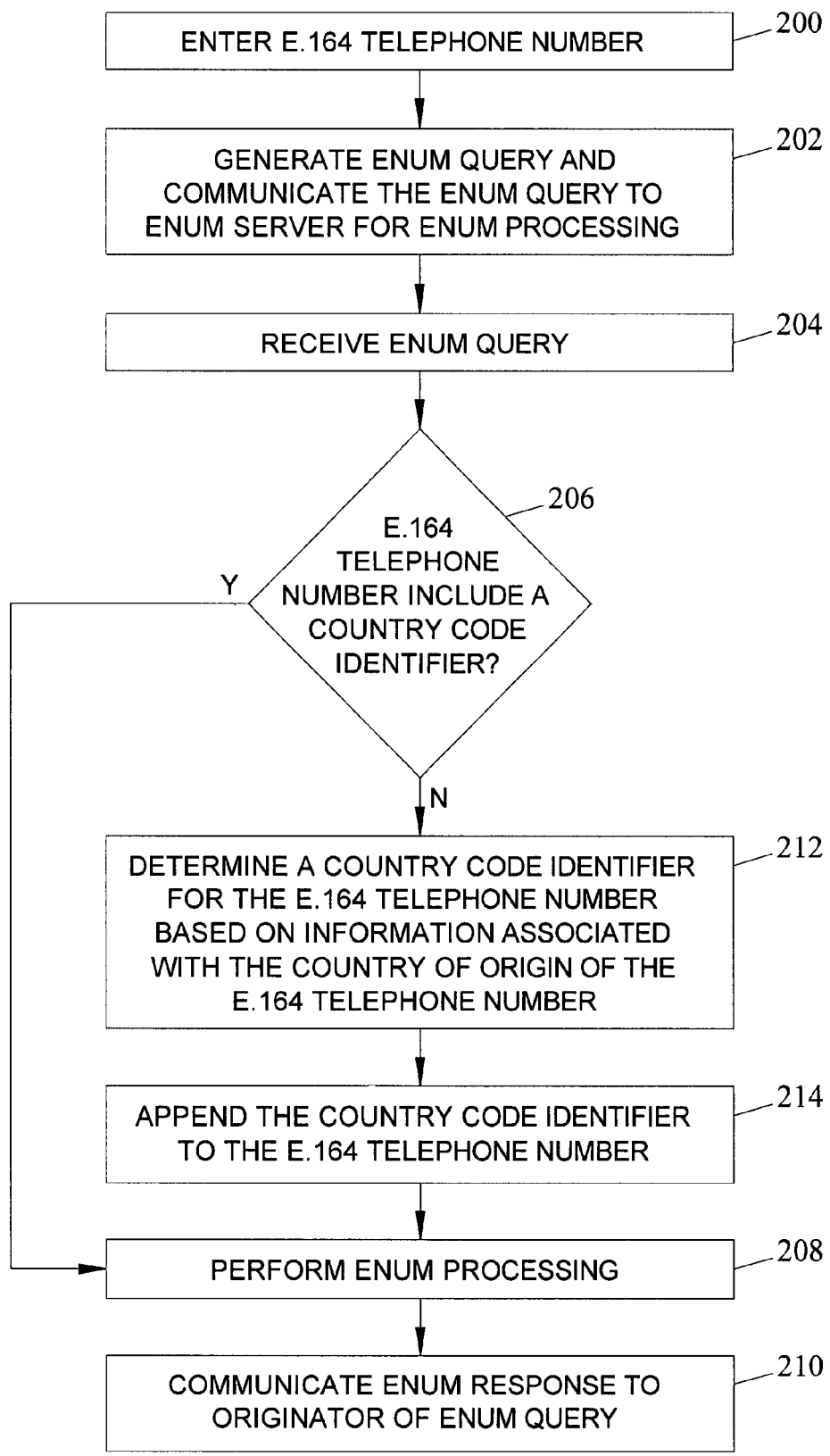
FIG. 2 is a flow chart of an exemplary process for providing a country code identifier in an international ENUM system according to an embodiment of the subject matter described herein.

FIG. 2 is a flow chart illustrating an exemplary process for providing a country code identifier in an international ENUM system according to an embodiment of the subject matter described herein. Referring to FIG. 2, in step 200, a user of end device 116 may enter an E.164 telephone number for reaching an end device 120. In this example, the entered E.164 telephone number is 4-3749-7530. The entered E.164 telephone number lacks a country code identifier (e.g., a country code prefix). An ISUP IAM 122 including the E.164 telephone number may be routed to MGC 108 via network 112.

In block 202, in response to receiving IAM 122, MGC 108 generates an ENUM query 124 and communicates ENUM query 124 to ENUM server 102 for ENUM processing. In particular, MGC 108 receives the E.164 telephone number in query 124 and converts the E.164 telephone number into ENUM message format for transmission in ENUM query 124. Further, ENUM query 124 includes a source IP address of MGC 108. The source IP address of MGC 108 is information associated with a country of origin of the E.164 telephone number. In particular, the source IP address of MGC 108 can be used for determining that France is the country of origin of the E.164 telephone number.

ENUM server 102 may receive ENUM query 124 via IP network 106 (block 204). ENUM server 102 may include an input/output (I/O) module 126 for receiving ENUM query 124 from MGC 108. ENUM server 102 may include an ENUM country code function 128 for determining whether the E.164 telephone number in ENUM query 124 includes a country code identifier (block 206). If it is determined that the E.164 telephone number includes a country code identifier, ENUM server 102 may perform ENUM processing based on the E.164 telephone number (block 208) and communicate an ENUM response message to MGC 108, the originator of ENUM query message 124 (block 210).

If it is determined that E.164 telephone number does not include a country code identifier, ENUM country code function 128 determines a country code identifier for the E.164 telephone number based on the information associated with the country of origin of the E.164 telephone number (block 212). For example, ENUM country code function 128 may perform a lookup in a mapping table of ENUM database 104 for an entry including a source IP address matching the source IP address contained in query message 124. The entry corresponding to a matching source IP address can include a country code identifier for the E.164 telephone number contained in query message 124. ENUM database 104 may include a plurality of entries that each associates a source IP address with a country code identifier.

Table 1 below shows exemplary entries for associating source IP addresses with country code identifiers.

TABLE 1

Exemplary Entries of Associating Source IP Addresses with Country Code Identifiers

| Source IP Address | Country Code Identifier |
|---|---|
| 110.100.90.1 Port 8090 | 33 |
| 110.100.90.2 Port 8090 | 55 |

ENUM country code function 128 may perform a lookup among the entries of Table 1 based on a source IP address of an ENUM query message including an E.164 telephone number without a country code identifier. An entry with a matching source IP address includes a country code identifier associated with the originator of the ENUM query message. For example, a source IP address of 110.100.90.1 and Port 8090 corresponds to a country code identifier of 33. In this example, source IP address 110.100.90.1 and Port 8090 corresponds to MGC 108. In another example, a source IP address of 110.100.90.2 and Port 8090 corresponds to a country code identifier of 55. In this example, source IP address 110.100.90.2 and Port 8090 corresponds to MGC 110.

In block 214, ENUM country code function 128 appends the country code identifier to the E.164 telephone number. The country code identifier may be appended to the E.164 telephone number in accordance with ENUM format. ENUM processing may be performed based on the E.164 telephone number (block 208). An ENUM response message 130 may be communicated to MGC 108 (block 210).

Figure 3:
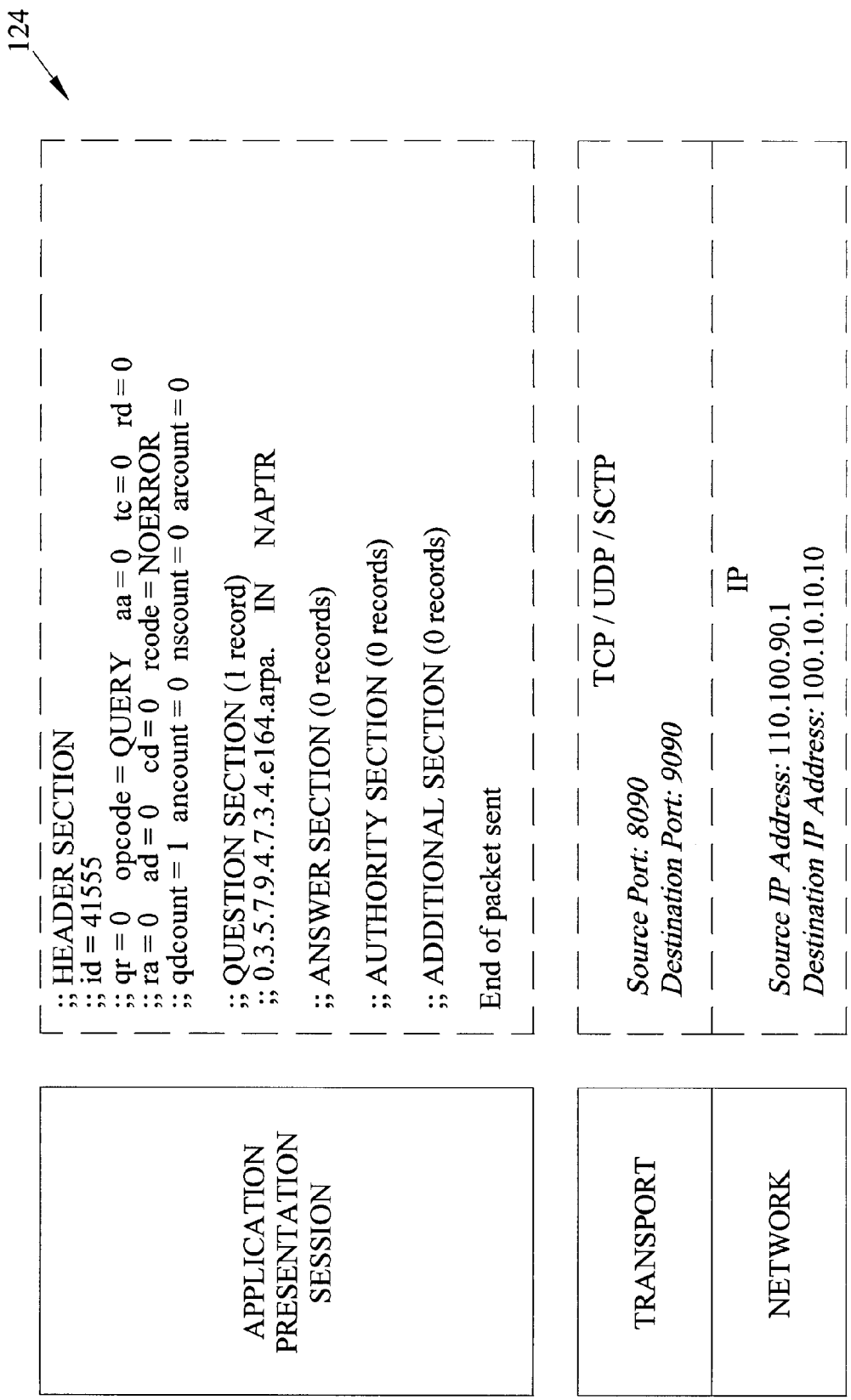
FIG. 3 is a block diagram of a portion of an ENUM query message shown in FIG. 1.

FIG. 3 is a block diagram of a portion of ENUM query message 124 shown in FIG. 1. Referring to FIG. 3, message 124 includes the converted E.164 telephone number 0.3.5.7.9.4.7.3.4.e164.arpa in its application presentation session section. The E.164 telephone number does not specify a country code. Message 124 also includes source port and destination information in the transport section and source and destination IP addresses in the network section. ENUM country code function 128 may extract the source IP address 110.100.90.1 and source port 8090 for use in determining a country code identifier for the E.164 telephone number. In the example of Table 1 above, the country code 33 corresponds to the source IP address and source port of message 124.

FIG. 4 is a block diagram of a portion of ENUM response message 130 shown in FIG. 1. ENUM response message 130 is the message generated by ENUM server 102 in response to receipt of ENUM query message 124. Referring to FIG. 4, message 130 includes E.164 telephone number with the appended country code identifier, which is 0.3.5.7.9.4.7.3.4.3.3.e164.arpa. The E.164 telephone number is contained in the application presentation session section of the message.

Figure 5:
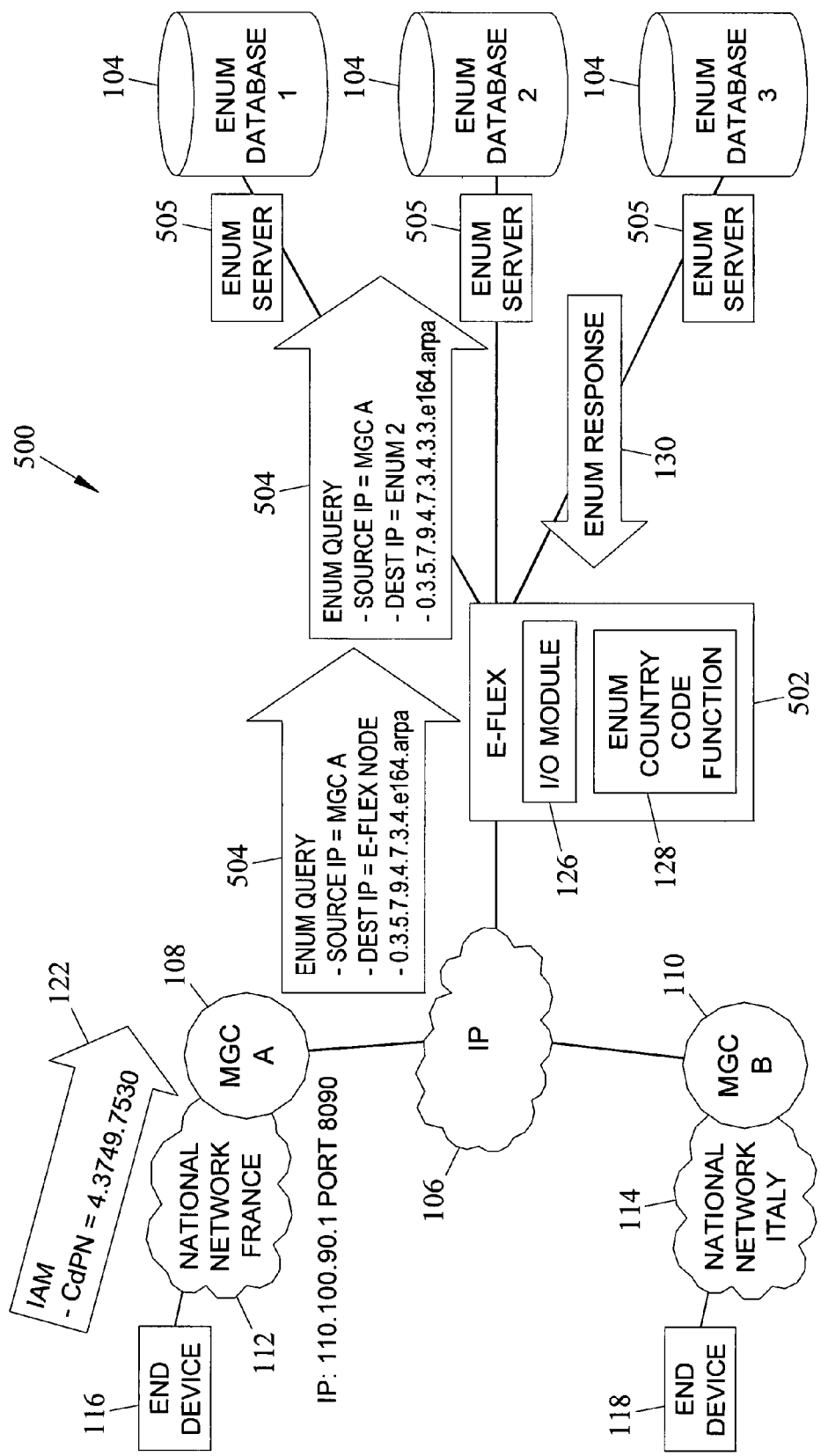
FIG. 5 is an exemplary system for providing a country code identifier in an international ENUM system according to an embodiment of the subject matter described herein.

FIG. 5 illustrates an exemplary system for providing a country code identifier in an international ENUM system, generally designated 500, according to an embodiment of the subject matter described herein. Referring to FIG. 5, system 500 can include an ENUM flexible numbering (E-Flex) node 502. E-Flex node 502 is configured to relay an ENUM query message or a copy of an ENUM query message to one of a plurality of ENUM servers 104. For example, an ENUM query message 504 may be generated by MGC 108 in response to receiving IAM 122. ENUM query message 504 is received (or intercepted) by an E-Flex function or node 502, which may be implemented as a hardware component or a software function.

E-Flex node 502 may include ENUM country code function 128 for providing a country code identifier in accordance with the subject matter described herein. Function 128 may determine whether the E.164 telephone number in ENUM query message 504 includes a country code identifier. If message 504 includes an E.164 telephone number that lacks a country code identifier, function 128 can use the source IP address in message 504 for searching entries (e.g., the entries shown in Table 1 above) for a matching source IP address. Function 128 can append the country code identifier corresponding to the matching source IP address to the E.164 telephone number in message 504. Further, E-Flex node 502 forwards message 504 with the full E.164 telephone number to an appropriate ENUM server 505 and ENUM database 104 for ENUM processing using the full E.164 telephone number. If message 504 includes an E.164 telephone number that has a country code identifier, E-Flex node 502 may forward message 504 to an appropriate ENUM database 104 for ENUM processing using the full E.164 telephone number.

In one example, ENUM databases may be country-specific such that the stored E.164 telephone numbers in the databases do not include country code identifier information. In this example, an ENUM country code function may determine an appropriate ENUM database in which to forward a received ENUM query based on country-specific information contained in the query. In FIG. 5 for example, ENUM databases 104 may store E.164 telephone numbers associated with different countries. The stored E.164 telephone numbers do not include country code prefix information. In one embodiment, E-Flex node 502 is configured to receive an ENUM query including an E.164 telephone number, examine the E.164 telephone number, determine an associated country, and address and send the ENUM query to the appropriate, country-specific ENUM database 104. If the E.164 telephone number includes a country code prefix, E-Flex node 502 may perform an ENUM processing action such as forwarding the ENUM query to the appropriate one of country-specific ENUM databases 104 based on the country code prefix. If the E.164 telephone number does not include a country code prefix, function 128 can use the source IP address in message 504 for searching entries of a database stored at E-Flex node 502 (e.g., the entries shown in Table 1 above) for a source IP address matching the source IP address of the message 504. The country code identifier corresponding to the matching entry may be used to select the appropriate one of country-specific ENUM databases 104 to which message 504 is forwarded for ENUM processing.

In one example, an E.164 telephone number in an ENUM query may include a country code prefix. In this example, ENUM server 505 corresponding to the destination ENUM database 104 may remove the country code prefix prior to ENUM processing.

Figure 6:
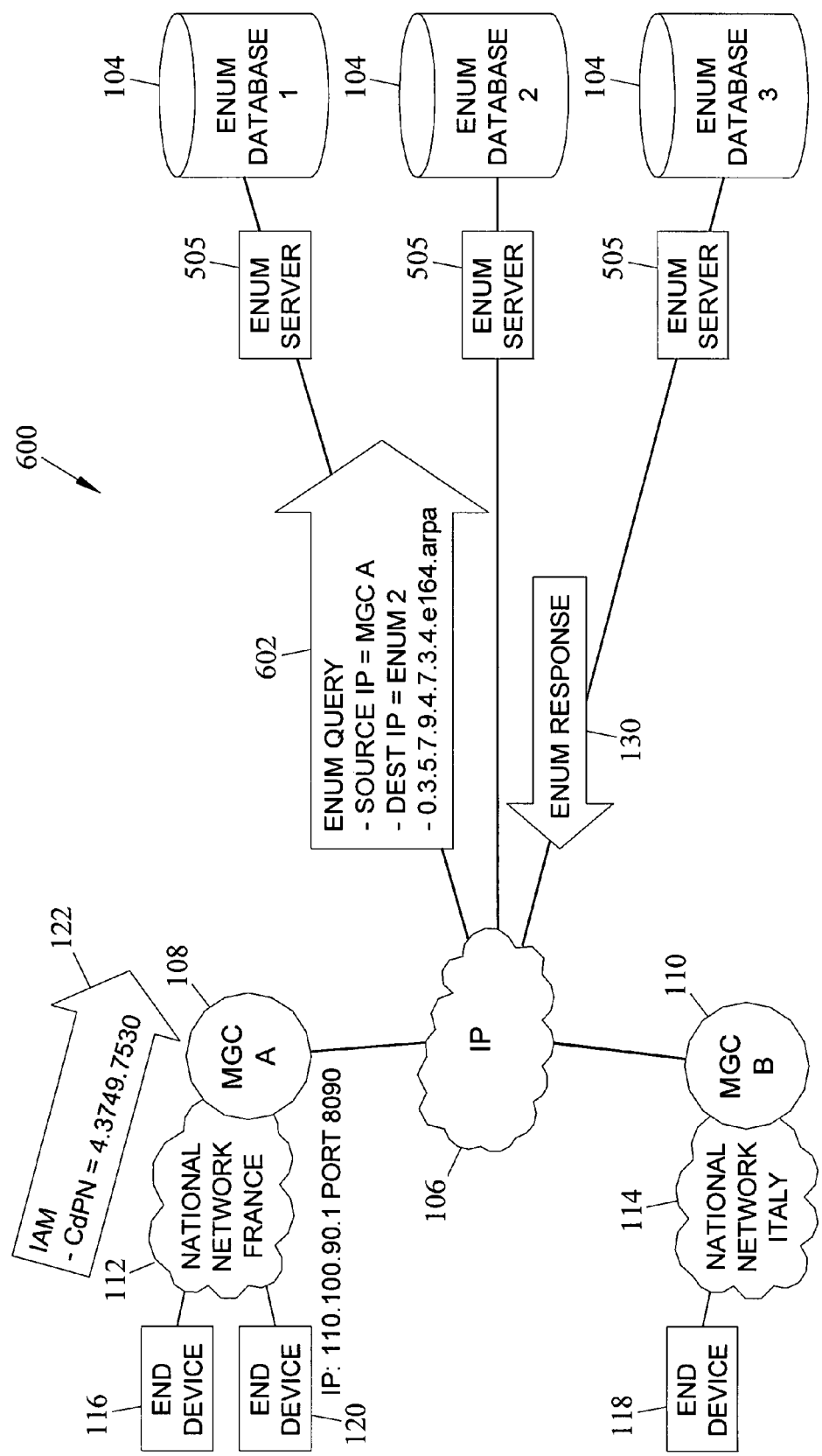
FIG. 6 is an exemplary system for determining a country in an international ENUM system according to an embodiment of the subject matter described herein.

In another example of country-specific ENUM databases, an originator of an ENUM query can be configured to determine one of the country-specific ENUM databases to which the ENUM query should be routed. FIG. 6 illustrates an exemplary system for determining a country in an international ENUM system, generally designated 600, according to an embodiment of the subject matter described herein. Referring to FIG. 6, MGC 108 is configured to receive IAM 122, examine the E.164 telephone number specified by IAM 122, and determine a country associated with the specified number. Further, MGC 108 can generate an ENUM query 602 based on IAM 122 and addressed to the appropriate one of country-specific ENUM databases 104. In one example, if the specified E.164 telephone number includes a country code prefix, MGC 108 may remove the country code prefix prior to routing ENUM query 602 to its destination. In another example, if the specified E.164 telephone number includes a country code prefix, MGC 108 may route an ENUM query including the full E.164 telephone number with the country code prefix to one of country-specific ENUM databases 104. In this example, ENUM server 505 corresponding to the destination ENUM database 104 may remove the country code prefix prior to ENUM processing.

In one embodiment, an ENUM system may perform one or more ENUM processing actions based on message information associated with a country of origin of the telephone number. For example, as set forth above, the ENUM system may forward the message to an ENUM database based on the message information associated with a country of origin of the telephone number. In another example, the ENUM system may access or point to a database based on the message information associated with a country of origin of the telephone number. For example, the database may be associated with ENUM translation processing. In another example, the database may be a country-specific ENUM database. In one example, the ENUM processing action(s) may be performed at an ENUM server, such as ENUM server 102 shown in FIG. 1.

Figure 7:
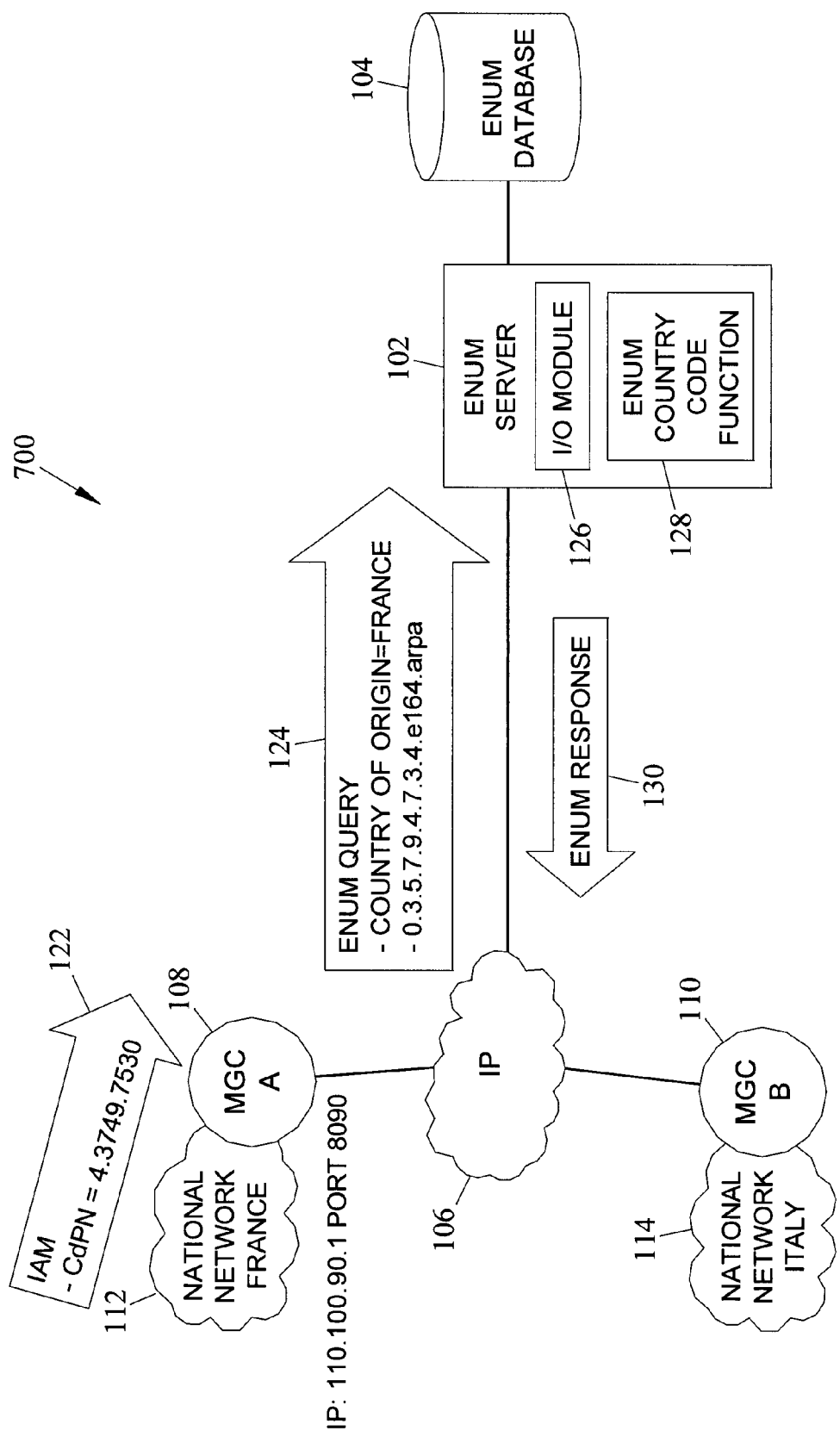
FIG. 7 is an exemplary system for determining a country in an international ENUM system according to an embodiment of the subject matter described herein.

In one embodiment, an ENUM country code function may be configured to utilize a parameter value contained in the body of an ENUM query for identifying a country of origin of the ENUM query. An originator of the ENUM query may be configured to include a parameter value identifying the country of origin of the ENUM query. The ENUM country code function may append a country code prefix to an E.164 telephone number in the ENUM query based on the parameter value. FIG. 7 illustrates an exemplary system for determining a country in an international ENUM system, generally designated 700, according to an embodiment of the subject matter described herein. Referring to FIG. 7, an ENUM query 124 may be generated by MGC 108 in response to receipt of IAM 122. Further, MGC 108 may insert a parameter value in the body of ENUM query 124 that indicates a country of origin of the query. In this example, the country of origin is France. The country of origin may be indicated by text and/or a numeric value. In an example of a numeric value, the numeric value may a country code country associated with the country of origin. The parameter value indicating the country of origin may be included in an additional section of an ENUM query.

ENUM server 102 may receive ENUM query 124 via IP network 130. ENUM country code function 128 may determine whether the E.164 telephone number specified by ENUM query 124 includes a country code prefix. If it is determined that the specified E.164 telephone number includes a country code prefix, ENUM processing can be performed based on the specified E.164 telephone number. If it is determined that the specified E.164 telephone number does not include a country code prefix, function 128 may determine a country code to append to the E.164 telephone number based on the parameter value indicating the country of origin of the ENUM query. For example, function 128 may perform a lookup in a mapping table in ENUM database 104 for an entry including a country of origin parameter value matching the country of origin parameter value contained in query message 124. The entry corresponding to a matching parameter value can include a country code identifier for the E.164 telephone number contained in query message 124. ENUM database 104 may include a plurality of entries that each associates a parameter value with a country code identifier.

Table 2 below shows exemplary entries for associating country of origin parameter values with country code identifiers.

TABLE 2

Exemplary Entries of Associating Country of Origin Parameter Values with Country Code Identifiers

| Country of Origin Parameter Value | Country Code Identifier |
|---|---|
| France | 33 |
| Italy | 55 |

ENUM country code function 128 may perform a lookup among the entries of Table 2 based on a parameter value of an ENUM query message including an E.164 telephone number without a country code identifier. An entry with a matching parameter value includes a country code identifier associated with the originator of the ENUM query message. For example, a parameter value of France corresponds to a country code identifier of 33. In another example, a parameter value of Italy corresponds to a country code identifier of 55.

Function 128 may append the country code identifier to the E.164 telephone number in accordance with ENUM format. Further, ENUM processing may be performed based on the E.164 telephone number.

Figure 8:
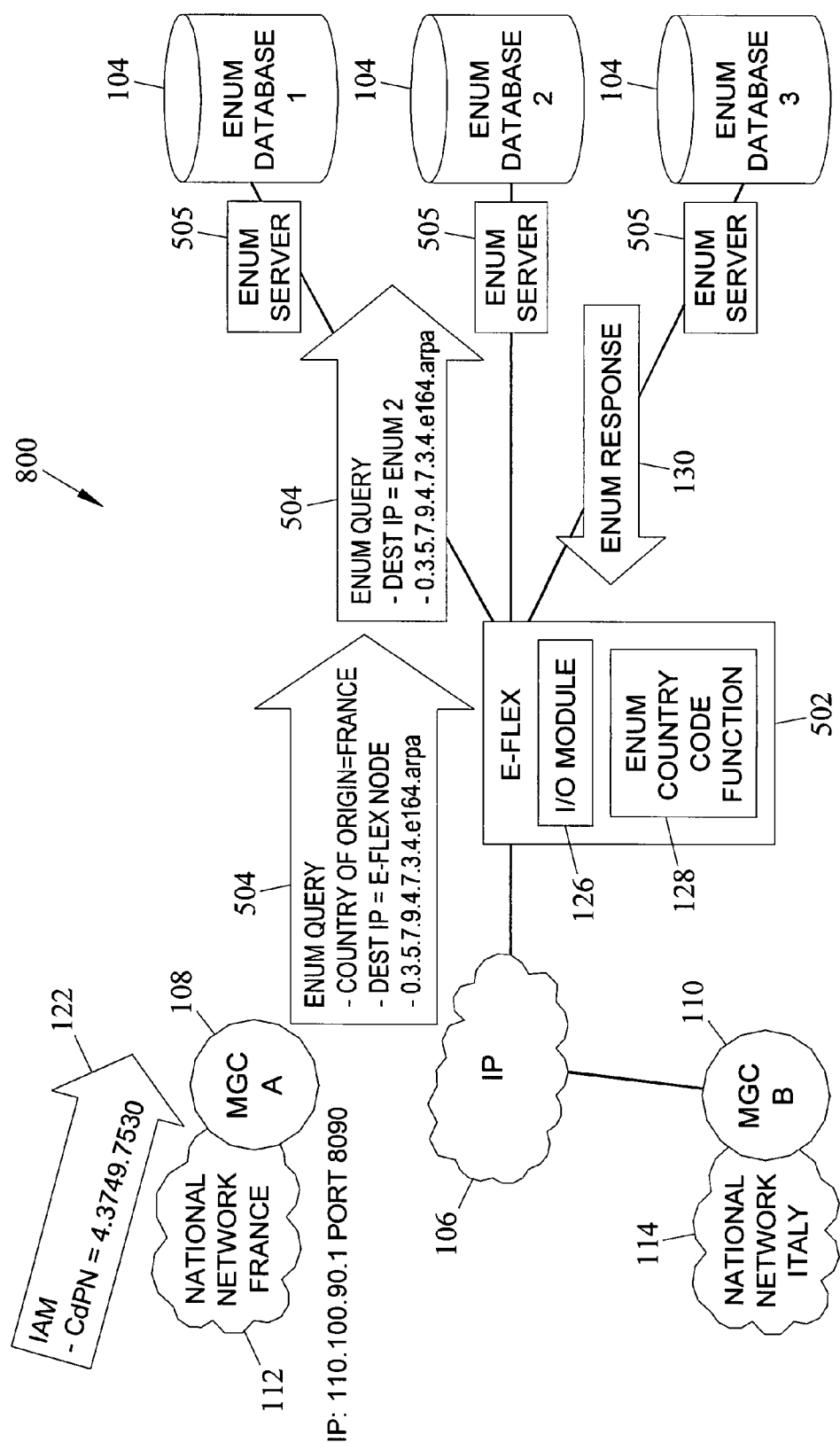
FIG. 8 is an exemplary system for providing a country code identifier in an international ENUM system according to an embodiment of the subject matter described herein.

In another example of using a parameter value of an ENUM query for identifying a country of origin, an E-Flex node can be configured to use the parameter value for identifying a country of origin of the ENUM query. FIG. 8 illustrates an exemplary system for providing a country code identifier in an international ENUM system, generally designated 800, according to an embodiment of the subject matter described herein. Referring to FIG. 8, E-Flex node 502 may receive ENUM query 124 via IP network 130. ENUM country code function 128 may determine whether the E.164 telephone number specified by ENUM query 124 includes a country code prefix. If it is determined that the specified E.164 telephone number includes a country code prefix, ENUM query 124 can be routed to an appropriate one of the country-specific ENUM databases 104 for ENUM processing based on the specified E.164 telephone number. If it is determined that the specified E.164 telephone number does not include a country code prefix, function 128 may determine a country code to append to the E.164 telephone number based on the parameter value indicating the country of origin of the ENUM query. The query can then be routed to an appropriate one of the country-specific ENUM databases 104 for ENUM processing based on the E.164 telephone number with the appended country code prefix.

In one example of the E.164 telephone number lacking a country code prefix, function 128 may use the country of origin parameter value to determine the appropriate one of the country-specific ENUM databases 104 to which ENUM query 504 should be routed. The destination ENUM database may be determined by performing a lookup in a plurality of entries that each include a country of origin parameter value and a corresponding ENUM database identifier. The ENUM database identifier may be a destination IP address for the ENUM database to which the query should be routed for ENUM processing.

Table 3 below shows exemplary entries for associating country of origin parameter values with ENUM database identifiers.

TABLE 3

Exemplary Entries of Associating Country of Origin Parameter Values with Country Code Identifiers

| Country of Origin Parameter Value | ENUM Database Identifier |
|---|---|
| France | ENUM DB 2 |
| Italy | ENUM DB 3 |

ENUM country code function 128 may perform a lookup among the entries of Table 3 based on a parameter value of an ENUM query message. An entry with a matching parameter value includes an ENUM database identifier. For example, a parameter value of France corresponds to ENUM database 2. In another example, a parameter value of Italy corresponds to ENUM database 3.

FIG. 9 is a block diagram of a portion of an exemplary ENUM query including a country of origin parameter value according to an embodiment of the subject matter described herein. Referring to FIG. 9, the query includes an ADDITIONAL SECTION indicating that the country of origin is France. An ENUM country code function may use the information for determining a country of origin of the query.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing a country code identifier in an international E.164 number mapping (ENUM) system, the method comprising:
at an ENUM server comprising a communication interface and a memory:
utilizing the communication interface to receive, from a media gateway controller, a message including an E.164 telephone number and information associated with a country of origin of the E.164 telephone number, wherein the information associated with the country of origin of the E.164 telephone number comprises an Internet protocol (IP) address associated with the media gateway controller, wherein the E.164 telephone number included in the message received from the media gateway controller lacks a country code identifier;
utilizing information stored in the memory to determine the country code identifier for the E.164 telephone number based on the information associated with the country of origin of the E.164 telephone number, wherein the country code identifier is determined based on the IP address associated with the media gateway controller;
appending the country code identifier to the E.164 telephone number of the received message to generate a full E.164 telephone number; and
utilizing the full E.164 telephone number to perform ENUM processing.

2. The method of claim 1 wherein receiving a message includes receiving an ENUM query.

3. The method of claim 1 wherein appending the country code identifier to the E.164 telephone number of the received message includes appending the country code identifier to the E.164 telephone number in the received message, and wherein the method comprises forwarding the message to a predetermined ENUM server based on the country code identifier.

4. The method of claim 1 comprising forwarding the message to one of a plurality of country-specific ENUM databases based on the determined country code identifier.

5. The method of claim 4 comprising performing ENUM processing at the one of the plurality of country-specific ENUM databases.

6. The method of claim 1 comprising performing ENUM processing based on the E.164 telephone number having the appended country code identifier.

7. A method for E.164 number mapping (ENUM) processing in an international ENUM system, the method comprising:
at an ENUM server comprising a communication interface and a memory:
utilizing the communication interface to receive, from a media gateway controller, a message including an E.164 telephone number and information associated with a country of origin of the E.164 telephone number, wherein the information associated with the country of origin of the E.164 telephone number comprises an Internet protocol (IP) address associated with the media gateway controller, wherein the E.164 telephone number included in the message received from the media gateway controller lacks a country code identifier;
utilizing information stored in the memory to determine an ENUM processing action based on the information associated with the country of origin of the E.164 telephone number, wherein the ENUM processing action is determined based on the IP address associated with the media gateway controller; and
performing the ENUM processing action based on the information associated with the country of origin of the E.164 telephone number.

8. The method of claim 7 wherein receiving a message includes receiving an ENUM query.

9. The method of claim 7 wherein performing the ENUM processing action includes forwarding the message to one of a plurality of country-specific ENUM databases based on the information associated with a country of origin of the E.164 telephone number.

10. The method of claim 9 comprising performing ENUM processing at the one of the plurality of country-specific ENUM databases.

11. The method of claim 10 wherein accessing or pointing to a database includes pointing to an ENUM database.

12. The method of claim 9 comprising removing a country code prefix in the E.164 telephone number.

13. The method of claim 7 wherein performing the ENUM processing action includes accessing or pointing to a database based on the information associated with a country of origin of the E.164 telephone number.

14. A system for providing a country code identifier in an international E.164 number mapping (ENUM) system, the system comprising:
a communications module configured to receive, from a media gateway controller, a message including an E.164 telephone number and information associated with a country of origin of the E.164 telephone number, wherein the information associated with the country of origin of the E.164 telephone number comprises an Internet protocol (IP) address associated with the media gateway controller, wherein the E.164 telephone number included in the message received from the media gateway controller lacks a country code identifier; and an ENUM country code function configured to determine a country code identifier for the E.164 telephone number based on the information associated with the country of origin of the E.164 telephone number and configured to append the country code identifier to the E.164 telephone number of the received message, wherein the ENUM country code function is configured to determine the country code identifier based on the IP address associated with the media gateway controller.

15. The system of claim 14 wherein the communications module is configured to receive an ENUM query.

16. The system of claim 14 wherein the ENUM country code function is configured to append the country code identifier to the E.164 telephone number in the received message and configured to forward the message to a predetermined ENUM server based on the country code identifier.

17. The system of claim 14 wherein the ENUM country code function is configured to forward the message to one of a plurality of country-specific ENUM databases based on the determined country code identifier.

18. The system of claim 17 comprising an ENUM server configured to perform ENUM processing in association with the one of the plurality of country-specific ENUM databases.

19. The system of claim 14 comprising an ENUM server configured to perform ENUM processing based on the E.164 telephone number having the appended country code identifier.

20. A system for E.164 number mapping (ENUM) processing in an international ENUM system, the system comprising:
 a communications module configured to receive, from a media gateway controller, a message including an E.164 telephone number and information associated with a country of origin of the E.164 telephone number, wherein the information associated with the country of origin of the E.164 telephone number comprises an Internet protocol (IP) address associated with the media gateway controller, wherein the E.164 telephone number included in the message received from the media gateway controller lacks a country code identifier; and
 an ENUM function configured to determine an ENUM processing action based on the information associated with the country of origin of the E.164 telephone number and configured to perform the ENUM processing action based on the information associated with the country of origin of the E.164 telephone number, wherein the ENUM function is configured to determine the ENUM processing action based on the IP address associated with the media gateway controller.

21. The system of claim 20 wherein the communications module is configured to receive an ENUM query.

22. The system of claim 20 wherein the ENUM function is configured to forward the message to one of a plurality of country-specific ENUM databases based on the determined country code identifier.

23. The system of claim 20 wherein the ENUM function is configured to access or point to a database based on the information associated with a country of origin of the E.164 telephone number.

24. The system of claim 23 wherein the ENUM function is configured to point to an ENUM database based on the information associated with a country of origin of the E.164 telephone number.

25. A computer program product comprising computer executable instructions embodied in a non-transitory computer readable medium for performing steps comprising:
 at an E.164 number mapping (ENUM) server comprising a communication interface and a memory:
 receiving, from a media gateway controller, a message including an E.164 telephone number and information associated with a country of origin of the E.164 telephone number, wherein the information associated with the country of origin of the E.164 telephone number comprises an Internet protocol (IP) address associated with the media gateway controller, wherein the E.164 telephone number included in the message received from the media gateway controller lacks a country code identifier;
 determining an E.164 number mapping (ENUM) processing action based on the information associated with the country of origin of the E.164 telephone number, wherein determining the ENUM processing action is based on the IP address associated with the media gateway controller; and
 performing the ENUM processing action based on the information associated with the country of origin of the E.164 telephone number.

* * * * *